Patented Feb. 7, 1928.

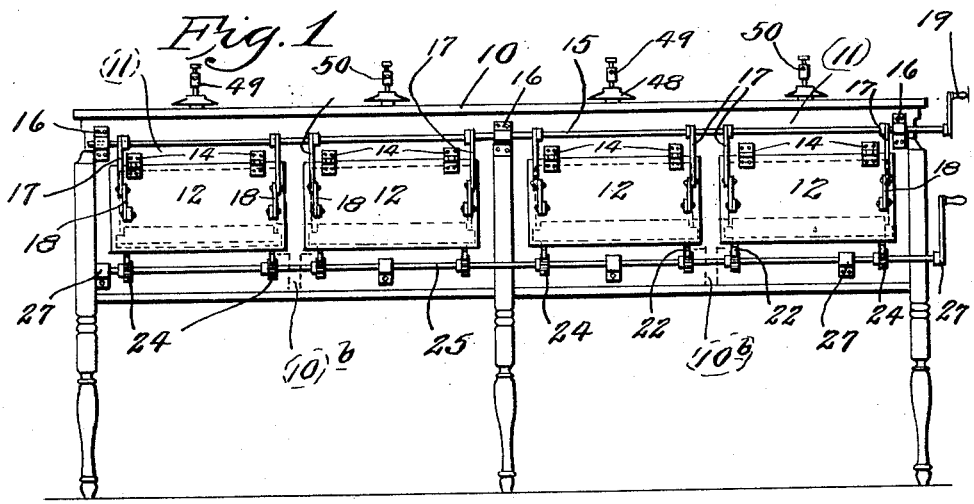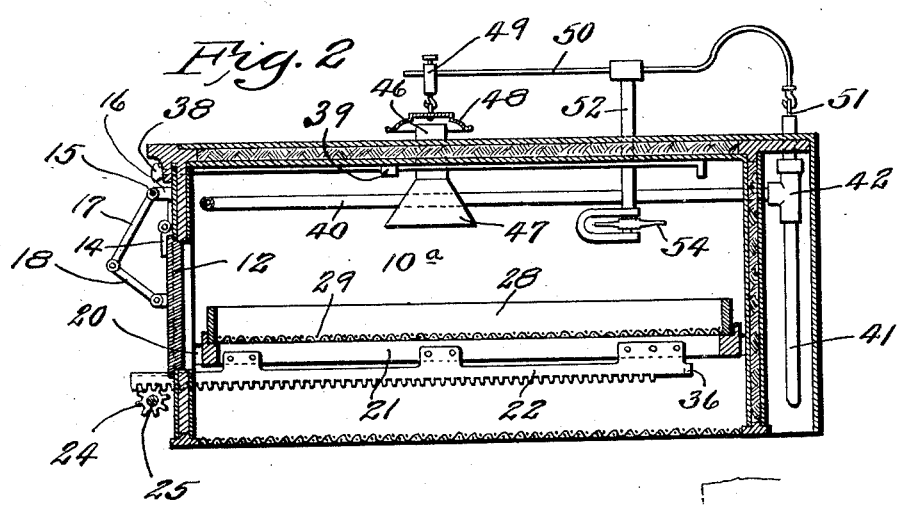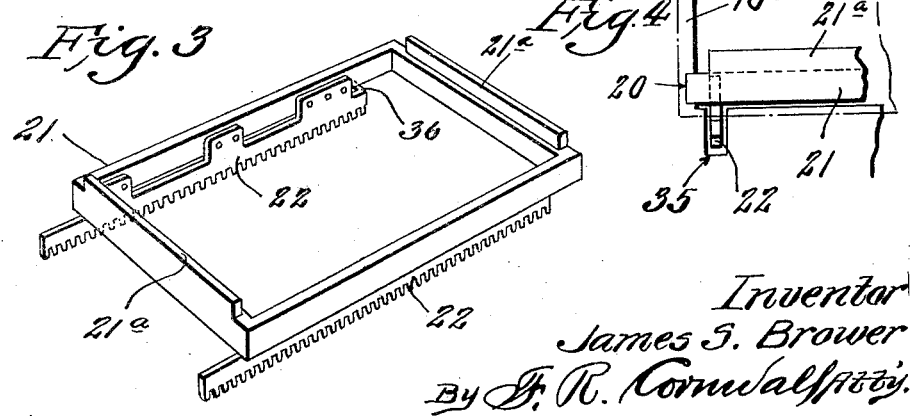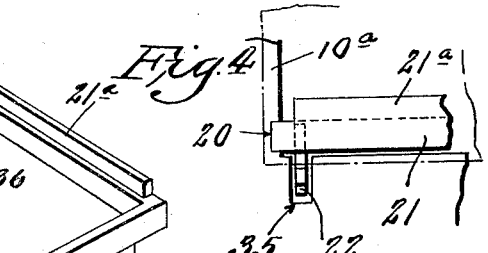

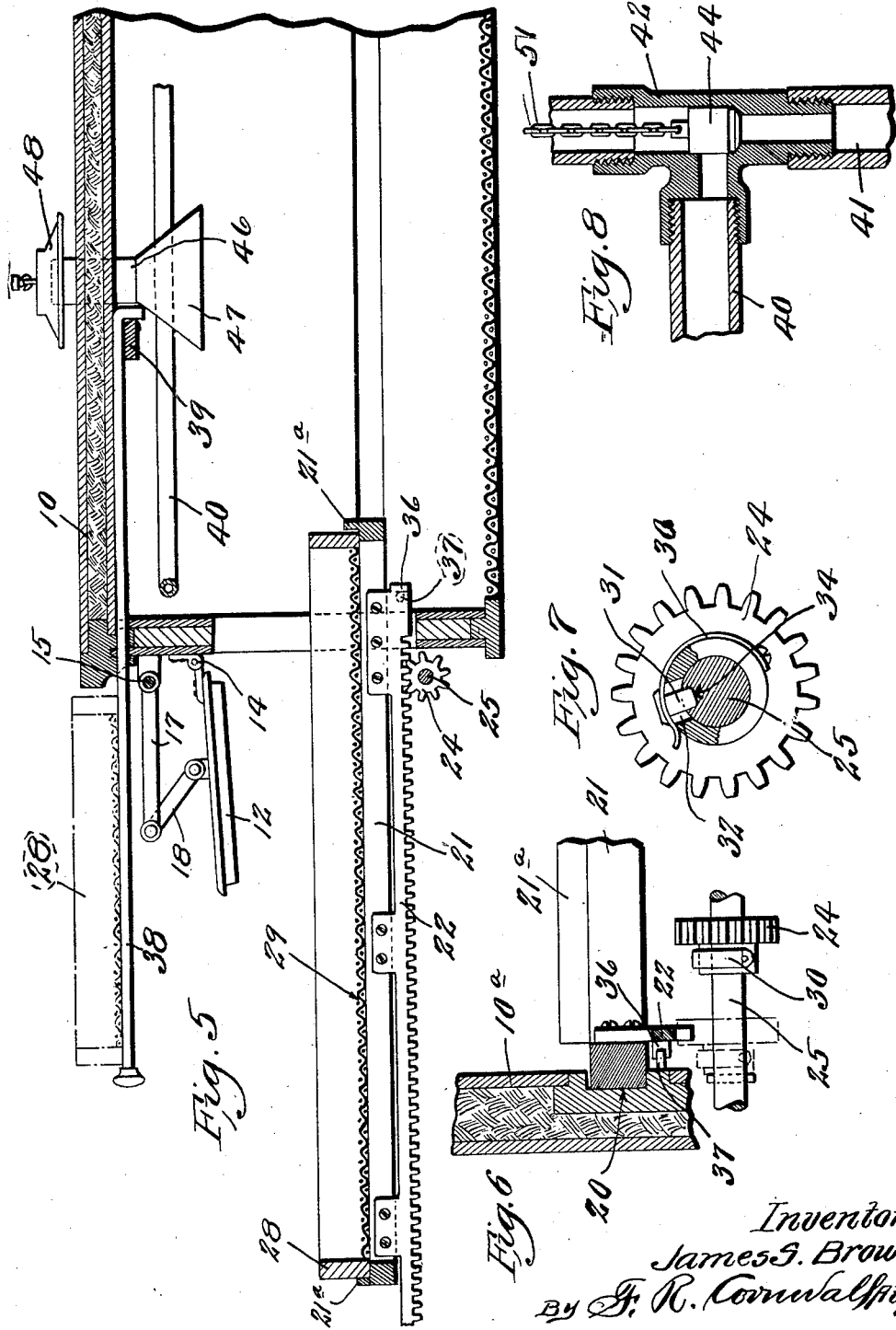

1,658,759

UNITED STATES PATENT OFFICE.

JAMES S. BROWER, OF ST. LOUIS, MISSOURI.

INCUBATOR.

Application filed September 25, 1922. Serial No. 590,363.

This invention relates to new and useful improvements in incubators and the objects of the invention are to provide simple and efficient means for collectively or individually moving the egg trays in and out of the incubating chamber.

With these and other objects in view, my invention consists in certain novel features of construction and arrangement of parts, hereinafter more fully described and claimed, and illustrated in the accompanying drawings, in which—

Figure 1 is a front elevational view of the incubator.

Figure 2 is a transverse cross sectional view through the same.

Figure 3 is a perspective detail view of the tray supporting sliding frame.

Figure 4 is a fragmental detail view of the incubator.

Figure 5 is a transverse cross sectional view through the incubator partly broken away and showing the parts thereof in moved positions.

Figure 6 is a detail sectional view through the side wall of the incubator and the tray supporting frame and showing the pinion in a disengaged position.

Figure 7 is an end elevational view partly in section of the pinion and showing the means for locking said pinion to the shaft.

Figure 8 is a vertical cross section through the valve casing and showing the improved valve seated therein.

Referring by numerals to the accompanying drawings, 10 represents an incubator having a plurality of incubating chambers 11, access to which may be gained by means of doors 12. Each door is hinged at its upper edge to the front wall of the incubator by means of hinges 14. A rod 15 is disposed in bearings 16 a short distance above doors 12 and has fixed thereto a series of arms 17, the outer ends of which are connected by links 18 to said doors. One end of rod 15 extends beyond the side wall 10<sup>a</sup> of the incubator and is provided with a handle 19 by the manipulation of which all of said doors 12 are simultaneously operated through the medium of rod 15, arms 17 and links 18. Side walls 10<sup>a</sup> and intermediate walls 10<sup>b</sup> are provided with inwardly presented channels 20 in which are slidably mounted the side members of frames 21. Depending from each side member is a rack 22 which is adapted to cooperate with a corresponding pinion 24 arranged on shaft 25 horizontally disposed below doors 12. This shaft is journaled in bearings 26 and is provided at one end with a manually operable handle 27.

Frames 21 receive egg trays 28, the bottom of which are preferably formed of fabric, as indicated at 29. In order to hold egg trays 28 against lengthwise movement when in position on frames 21, the ends of said frames are provided with upwardly projecting flanges 21<sup>a</sup> which are arranged to bear against the ends of egg trays 28 and hold them in position. Pinions 24 are displaceably mounted on shaft 25 and can be moved out of engagement with corresponding racks 22 to permit selective movement of the frames 21 and the trays supported thereon.

When pinion 24 is in engagement with its corresponding rack, said pinion is locked to shaft 25 by means of a semi-circular spring 30, one end of which is secured to the hub of the pinion while its opposite end carries a pin 31 which passes downwardly through an opening 32 formed in said hub and rests in a recess or seat 34 formed in shaft 25. The forward end of each rack terminates past the frame 21 and projects outwardly from the incubator through a suitable opening 35 formed therein so as to be at all times in position to be engaged by its respective pinion.

When it is desired to inspect the eggs or place egg trays on frames 21, doors 22 are opened by the manipulation of handle 19. Shaft 25 is now actuated by handle 27 so that pinions 24 are rotated and cause, through their interengagement with racks 22, the outward movement of frames 21. If for any reason it is not desired to bring forward from the incubating chamber a certain tray, pinions 24 engaging the corresponding racks of said tray are displaced from their rack engaging positions, whereby the operative connection between the shaft and the particular tray is broken. To displace the pinion, the free end of spring member 30 is engaged by the operator's finger and is lifted outwardly and upwardly until pin 31 is disengaged from its seat 34 in shaft 25. Pinion 24 is now shifted on shaft 25 out of engagement with the rack 22. To restore pinion 24 to its operative position, said pinion is shifted on shaft 25 until its hub bears against pin 25<sup>a</sup> fixed in shaft 25, whereby pinion 24 will be in engagement with rack 22 and pin 31 will be seated in recess 34.

In order to limit the outward movement of frame 21 and prevent the accidental displacement thereof from its seat 20, the rear end of each rack is provided with a lateral outwardly projecting lug or projection 36 which when the frame reaches its extreme outward position strikes against the stop pin 37 fixed in the side or intermediate walls of the incubator and projecting outwardly in the path of travel of lugs 36, thereby limiting the movement of said tray.

The incubator is provided with a series of slide rods 38 which are disposed therein adjacent to the top wall thereof and their inner portions have bearings in suitable brackets 39. The inner ends of these rods are bent laterally to form a bracket engaging stop for preventing the withdrawal of said rods from the incubator. These rods 38 can be pulled outward a suitable distance and are designed to be used as a temporary support for the egg trays, the latter being placed transversely thereon as shown in Figure 5.

The incubating chambers are heated by hot water pipes 40 which are connected to a common supply pipe 41. The connection between the supply pipe 41 and the hot water pipes 40 is established by means of a valve casing 42 and the connection is controlled by a cylindrical valve 44 seated in valve casing 42. Each chamber is provided with a ventilator 46 having a flaring lower end 47 extending into the chamber below the plane occupied by hot water pipe 40 and having its open end adapted to be closed by a closure member 48. This closure member is adjustably mounted by means of an adjusting member 49 upon one end of a rod 50 and valve 44 is suspended from the opposite end of said rod by a chain 51.

Rod or handle 50 is pivotally supported on the incubator by a suitable bracket or support 52 and is adapted to be actuated by a thermostat 54 arranged in each incubating chamber. Thermostat 54, closure member 48, and valve 44 are adjusted so as to maintain the proper temperature in the incubating chamber and said rod is actuated by said thermostat to close ventilator 46 and unseat valve 44 when the temperature in the incubating chamber falls below a predetermined degree, or vice versa when the temperature rises above a certain degree.

I claim:

1. In an incubator having a plurality of incubating chambers, the side walls of each of which are provided with longitudinally disposed grooves, the combination of a rectangular frame having its sides slidably arranged in said grooves, an egg tray removably supported on each frame, the ends of each frame being provided with upward projections for engaging the ends of the corresponding tray, racks depending from the sides of each frame and having their forward ends projecting beyond said frame through the front walls of said chambers, a horizontally disposed shaft journalled exteriorly of said incubator below the horizontal plane of said frame, pinions on said shaft for meshing with said racks, a handle for manually operating said shaft and simultaneously positioning all of said frames in and out of the respective chambers and a stop extending transversely and inwardly from one of the side walls and adapted to be engaged by a portion of the corresponding rack for preventing the displacement of the frame.

2. In an incubator having a plurality of incubating chambers, the side walls of each of which are provided with longitudinally disposed grooves, the combination of a rectangular frame having its sides slidably arranged in the grooves of the respective chamber, an egg tray removably supported on each frame, a rack depending from the side of each frame and having its forward end projecting outwardly through the front wall of the incubator, a horizontally disposed shaft journalled exteriorly of said incubator below the horizontal plane of said frame, pinions fixed on said shaft and meshing with said racks, a handle for manually operating said shaft and simultaneously positioning all of said frames in and out of the respective chambers, and a door for each chamber.

In testimony whereof I hereunto affix my signature this 5th day of September, 1922.

JAMES S. BROWER.